US007493595B2

(12) United States Patent
Simonoff et al.

(10) Patent No.: US 7,493,595 B2
(45) Date of Patent: Feb. 17, 2009

(54) MULTIPLE-USER GRAPHICAL PROGRAMMING AND ANALYSIS ENVIRONMENT

(75) Inventors: Adam J Simonoff, Fairfax Station, VA (US); Julian B. Hebert, Jr., Warsaw, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 829 days.

(21) Appl. No.: 10/750,632

(22) Filed: Dec. 19, 2003

(65) Prior Publication Data

US 2005/0138601 A1    Jun. 23, 2005

(51) Int. Cl.
*G06F 9/44* (2006.01)

(52) U.S. Cl. .................. 717/109; 717/113; 717/105; 717/107; 709/250; 700/86; 445/24

(58) Field of Classification Search .......... 717/104–113
See application file for complete search history.

(56) References Cited

U.S. PATENT DOCUMENTS

| | | | | |
|---|---|---|---|---|
| 4,813,013 | A | 3/1989 | Dunn | 364/900 |
| 5,008,853 | A | 4/1991 | Bly et al. | 364/900 |
| 5,490,097 | A | 2/1996 | Swenson et al. | 364/578 |
| 5,497,500 | A * | 3/1996 | Rogers et al. | 717/109 |
| 5,966,532 | A * | 10/1999 | McDonald et al. | 717/105 |
| 5,974,254 | A * | 10/1999 | Hsu | 717/109 |
| 6,078,948 | A | 6/2000 | Podgorny et al. | 709/204 |
| 6,154,875 | A * | 11/2000 | Tanaka et al. | 717/107 |
| 6,175,954 | B1 | 1/2001 | Nelson et al. | 717/2 |
| 6,182,278 | B1 * | 1/2001 | Hamada et al. | 717/107 |
| 6,282,699 | B1 * | 8/2001 | Zhang et al. | 717/109 |
| 6,338,086 | B1 | 1/2002 | Curtis et al. | 709/218 |
| 6,351,777 | B1 * | 2/2002 | Simonoff | 709/250 |
| 6,370,681 | B1 | 4/2002 | Dellarocas et al. | 717/1 |
| 6,437,805 | B1 * | 8/2002 | Sojoodi et al. | 715/763 |
| 6,463,460 | B1 | 10/2002 | Simonoff | 709/203 |
| 6,484,155 | B1 | 11/2002 | Kiss et al. | 706/46 |
| 6,526,566 | B1 * | 2/2003 | Austin | 717/109 |
| 6,690,981 | B1 * | 2/2004 | Kawachi et al. | 700/83 |
| 6,738,964 | B1 * | 5/2004 | Zink et al. | 717/105 |
| 6,763,515 | B1 * | 7/2004 | Vazquez et al. | 717/109 |
| 6,802,053 | B1 * | 10/2004 | Dye et al. | 717/113 |
| 6,912,707 | B1 * | 6/2005 | Fontes, Jr. | 717/113 |
| 6,931,288 | B1 * | 8/2005 | Lee et al. | 700/86 |

(Continued)

*Primary Examiner*—Wei Y Zhen
*Assistant Examiner*—Phillip H Nguyen
(74) *Attorney, Agent, or Firm*—Gerhard W. Thielman, Esq

(57) ABSTRACT

A multiple-user graphical programming and analysis environment is disclosed that includes graphically represented code objects, graphically represented inter-code object connections, application programs, and a graphical white board area. Each code object may be created by a user, and accessible by other users in an asynchronous fashion, in accordance with the security privileges of the other users. Each inter-code object connection represents data transfer between a pair of code objects. Each application program is made up of one or more chains of the code objects, interconnected via the inter-code object connections. The code objects are definable and movable within the graphical white board area, and the inter-code object connections are creatable within this area. The application programs are executable within the graphical white board area. The code objects, as well as the environment itself, may be developed in an architecture-independent and Internet web browsing program-independent computer programming technology, such as Java.

36 Claims, 8 Drawing Sheets

U.S. PATENT DOCUMENTS

| | | | |
|---|---|---|---|
| 6,971,065 B2 * | 11/2005 | Austin | 715/763 |
| 7,000,191 B2 * | 2/2006 | Schmitt et al. | 715/764 |
| 7,062,718 B2 * | 6/2006 | Kodosky et al. | 715/771 |
| 7,137,071 B2 * | 11/2006 | Fuller et al. | 715/771 |
| 7,177,909 B2 * | 2/2007 | Stark et al. | 709/206 |
| 7,200,838 B2 * | 4/2007 | Kodosky et al. | 717/116 |
| 2003/0023685 A1 | 1/2003 | Cousins et al. | 709/205 |
| 2003/0037144 A1 | 2/2003 | Pestoni et al. | 709/226 |
| 2003/0061349 A1 | 3/2003 | Lo et al. | 709/225 |
| 2004/0235384 A1 * | 11/2004 | Reich et al. | 445/24 |

* cited by examiner

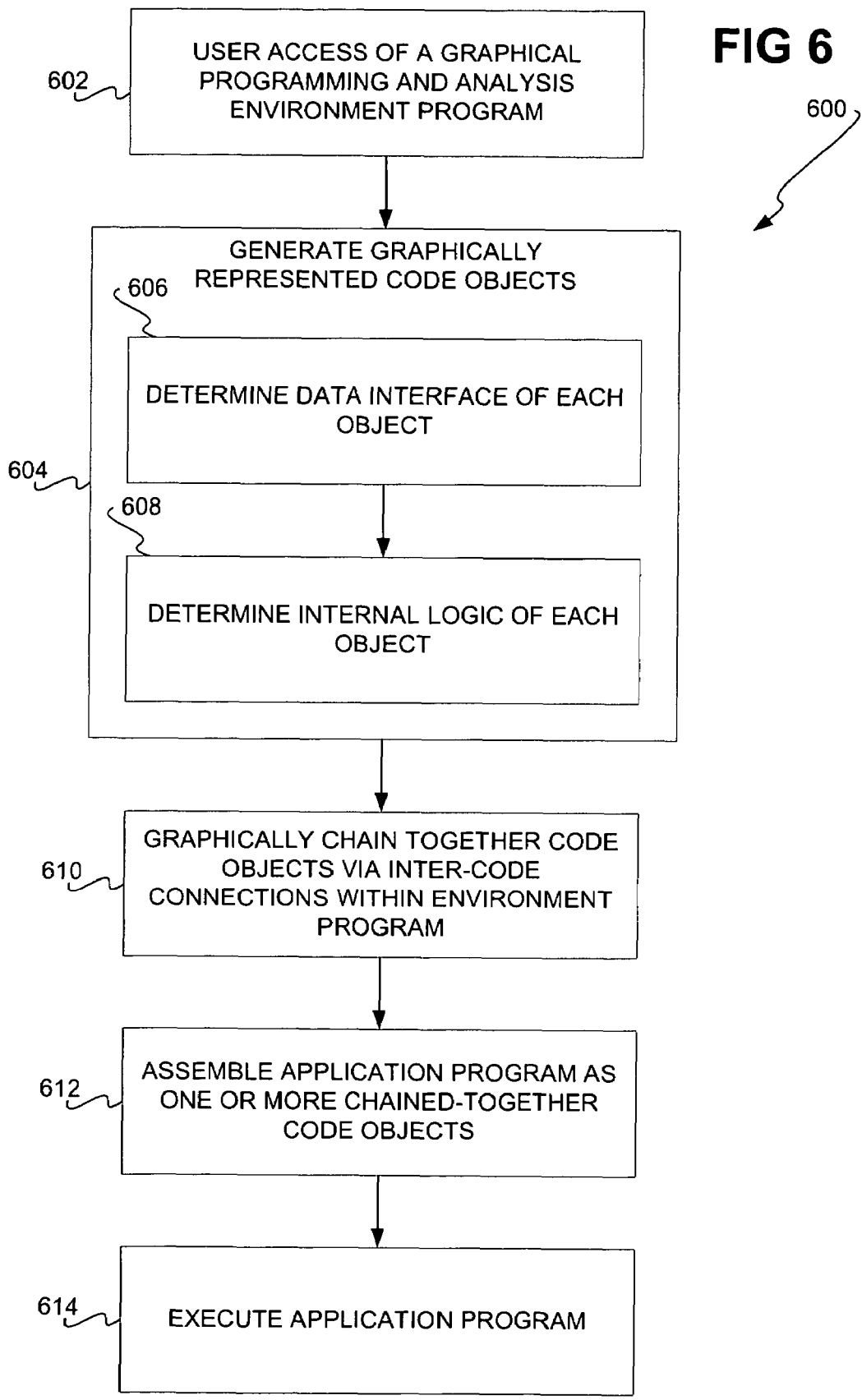

MULTIPLE-USER GRAPHICAL PROGRAMMING AND ANALYSIS ENVIRONMENT

BACKGROUND OF THE INVENTION

Computer programs have become generally recognized as good analytical tools and decision aids for a number of different problem sets. Typically, once a problem set is identified, a computer program that can act as an analytical tool or a decision aid within the problem set is coded from scratch. Specifications for the program may be drafted, and then a computer programmer or a team of programmers may be called in to develop the program in accordance with the specifications.

Such computer program development can, however, be time-consuming, costly, and inconvenient. For certain problem sets, a quickly developed analytical tool or decision aid may be desired. The time and cost necessary to draft specifications and retain one or more computer programmers to develop a custom program may be too great, such that the program is ultimately never developed. End users who are not computer programmers especially may decide that, although computer programs to assist their analyses or decisions within problem sets may be desirable, the cost and expense in obtaining them are not worth the benefits that such programs can provide.

For these and other reasons, therefore, there is a need for the present invention.

SUMMARY OF THE INVENTION

The invention relates to a multiple-user graphical programming and analysis environment. A multiple-user graphical programming and analysis environment computer program may include graphically represented code objects, graphically represented inter-code object connections, application programs, and a graphical white board area. Each code object may be created by a user, and accessible by other users in an asynchronous or synchronous fashion, in accordance with the security privileges of the other users. Each inter-code object connection represents data transfer between a pair of code objects. There may be any number of inter-code object connections connecting code objects together. Each application program is made up of one or more chains of the code objects, interconnected via the inter-code object connections. The code objects are definable and movable within the graphical white board area, and the inter-code object connections are creatable within this area. An inter-code object connection may be graphically terminated on any edge or interior of a code object. An inter-code object may be represented by a line or as a directed graph. The application programs are executable within the graphical white board area as well.

Embodiments of the invention provide for advantages over the prior art. Users can asynchronously or synchronously program together as a group, with each user contributing to an application program in real-time and optionally view the results immediately. The graphical object-oriented nature of the programming environment eases the programming process, allowing users to employ objects of varying complexity represented graphically within the white board area. This allows users with little or no computer programming experience to graphically construct application programs. Furthermore, the graphically represented code objects may be moved and rearranged as desired. Depending on the functions of the objects, the objects may even be programmed to reprogram themselves, or graphically perform neural networks. Once the source code is written for a graphically represented code object, the object is reusable across multiple application programs, such that the source code does not have to be developed again.

Embodiments of the invention may further be dynamically extensible, in that new graphically represented code objects may be added and used at any time. Because users are accorded access to objects based on their security privileges, embodiments of the invention can also provide a secure object programming environment. The objects may be hidden in part or in their entirety, based on the security privileges of the users. For instance, functionality of the objects may be restricted, reduced, or limited based on the security privileges of the objects themselves, or the privileges of the users.

Preferably, the graphically represented code objects are centrally stored and accessed from one or more servers on a network. The user may thus access the objects from within the white board area that may be instantiated within an Internet web browsing program. Embodiments of the invention may be implemented so as to be browser-independent, too, by utilizing the JAVA® programming language technology, or another type of programming language technology that does not require a specific brand of web browsing program. Similarly, by utilizing JAVA® technology or another type of technology, embodiments of the invention may be architecture and operating system independent.

Still other aspects, advantages, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 6 is a flowchart of a method for constructing an application program within a multiple-user graphical programming and analysis environment, according to an embodiment of the invention.

DETAILED DESCRIPTION OF THE PREFERRED EMBODIMENTS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Multi-User Graphical Programming and Analysis Environment

Figure 1:
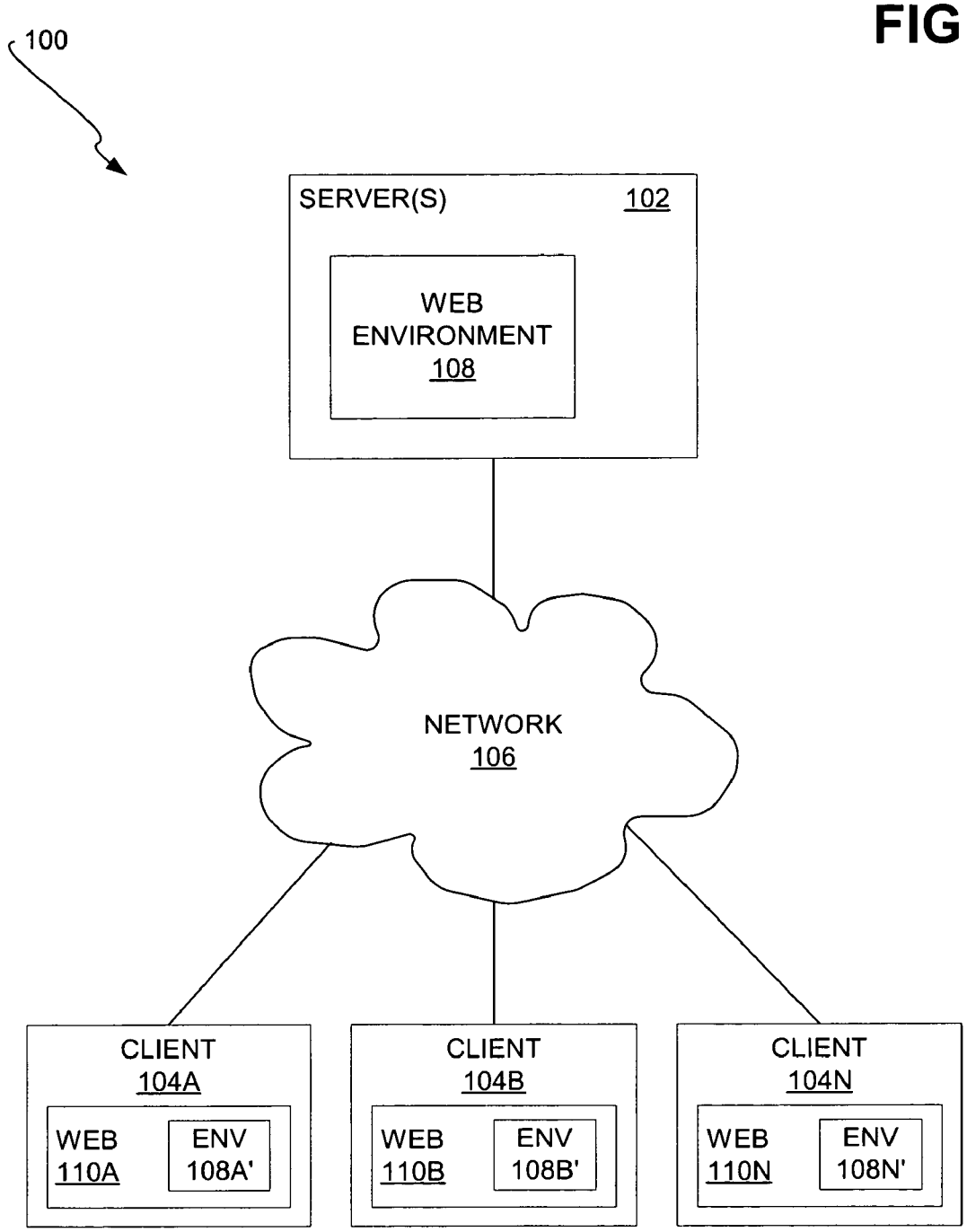
FIG. 1 is a diagram of a physical system in conjunction with which a multiple-user graphical programming and analysis environment may be implemented, according to an embodiment of the invention.

FIG. 1 shows a representative physical system 100, in conjunction with which embodiments of the invention may be implemented. The system 100 includes one or more servers 102 communicatively coupled to clients 104A, 104B, ..., 104N, over a network 106. The clients 104A, 104B, ..., 104N are collectively referred to as the clients 104. Each of the servers 102 and the clients 104 may be or include a computing device, such as a desktop or a laptop computer, or another type of computing device. The network 106 may be or include local-area networks (LAN's), wide-area networks (WAN's), intranets, extranets, virtual private networks (VPN's), the Internet, wired networks, and/or wireless networks, as well as other types of networks.

A multiple-user graphical programming and analysis environment 108 runs as one or more programs on the servers 102, as is described in more detail later in the detailed description. The clients 104 run web browsing programs 110A, 110B, ..., 110N, collectively referred to as the web browsing programs 110. The web browsing programs 110 may be versions of the INTERNET EXPLORER® web browsing program, available from Microsoft Corp., of Redmond, Wash., or other types of web browsing programs, as known to those of ordinary skill within the art. The users of the clients 104 are able to access and interact with the environment 108 running on the servers 102 via the web browsing programs 110, over the network 106. The clients 104 also run operating systems in conjunction with which the web browsing programs 110 run. Such operating systems may include versions of the WINDOWS® operating system, available from Microsoft Corp., versions of the MACINTOSH® operating system, available from Apple, Inc., of Cupertino, Calif., as well as versions of the UNIX® operating system and versions of the LINUX® operating system. Instantiations of the environment 108 are run within the web browsing programs of the clients 104, as the environments 108A', 108B', ..., 108N', collectively referred to as the environments 108'.

Figure 2:
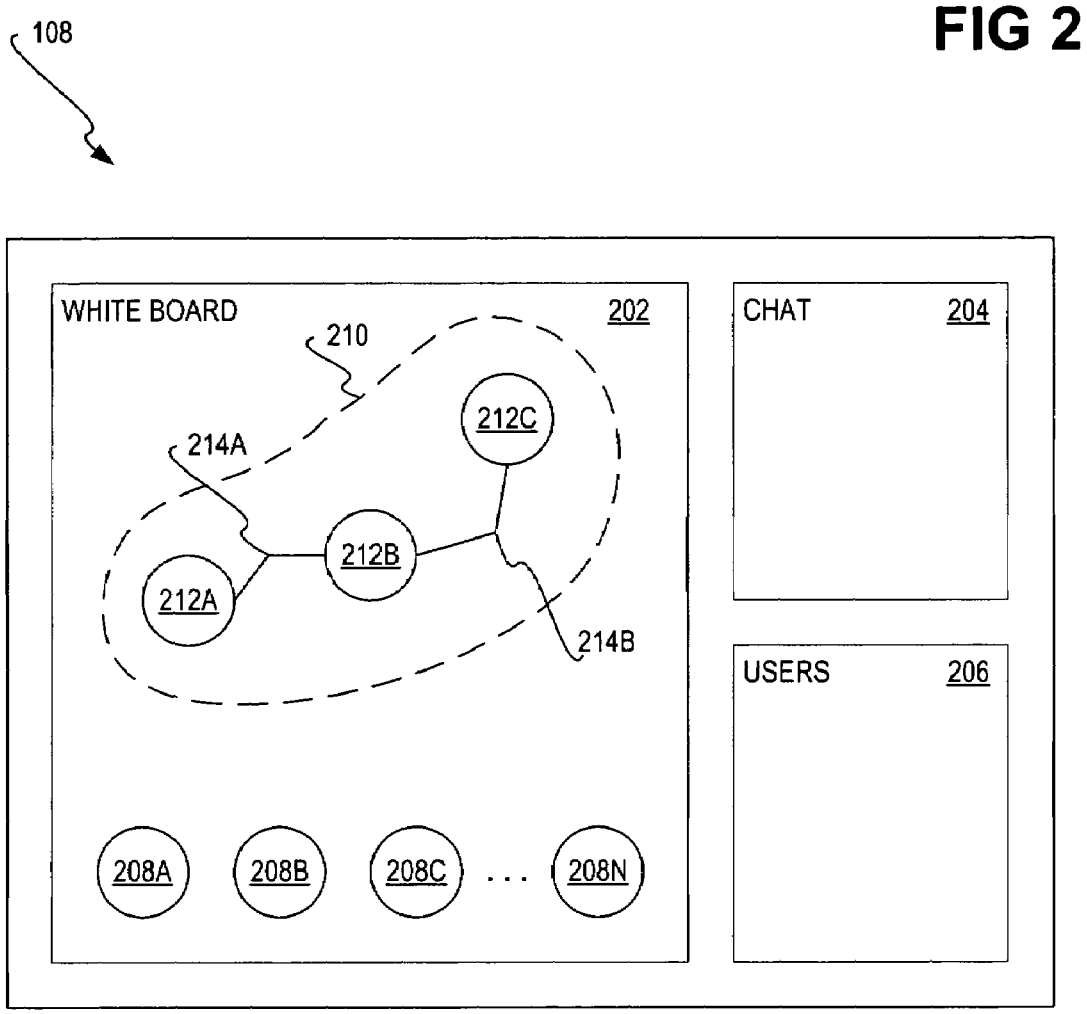
FIG. 2 is a diagram of a multiple-user graphical programming and analysis environment, according to an embodiment of the invention.

FIG. 2 shows the multiple-user graphical programming and analysis environment 108 as displayed by and accessed from one of the web browsing programs 110 running on the clients 104 as the environments 108', according to an embodiment of the invention. The environment 108 includes a graphical white board area 202, a chat area 204, and a user list area 206. The graphical white board area 202 may be considered to visually represent the environment 108. The chat area 204 allows users to enter and display short text messages to one another, whereas the user list area 206 shows the name of the users currently logged into the environment 108. In the preferred embodiment, the environment 108 is implemented as a computer program described in U.S. Pat. No. 6,351,777, issued to Simonoff on Feb. 26, 2002, and U.S. Pat. No. 6,463,460, issued to Simonoff on Oct. 8, 2002, both of which are hereby incorporated by reference.

The environment 108 may further be a computer program coded in the JAVA® programming language, initially developed by Sun Microsystems, Inc., of Santa Clara, Calif. The environment 108 may include areas 202, 204, and 206 that may be separately coded as JAVA® objects. An applet program is generally defined as a small application computer program. The utilization of the JAVA® technology, or a similar type of computer programming technology, allows for the environment 108 to be accessed in a browser-neutral and architecture-independent manner. That is, the type or brand of the clients 104 of FIG. 1 and the type or brand of the web browsing programs 110 running thereon do not have to be specified, so long as these clients 104 and these programs 110 are capable of running JAVA® or similar type of technology.

Graphically represented code objects 208A, 208B, ..., 208N, collectively referred to as the code objects 208, are definable and movable within the graphical white board area 202. The code objects 208 may be applet programs that are run within the applet context of the graphical white board area 202, and thus of the context of the environment program 108 itself. Each of the code objects 208 is created by a user, and accessible by other users in accordance with their security privileges, and/or the security privileges attached to the code object in question. The levels of security may also be different for the code objects 208. For instance, the creating author of a code object 208 may have full access to the underlying code of the object 208, whereas other users may only be able to use the object 208 within developed application programs, and may not be able to modify the source code of the object 208. Security privileges may restrict which functions or features of the object 208 are available to each user.

Non-graphically represented code objects may also coexist with the code objects 208 within the white board area 202. Such non-graphically represented code objects may include stand-alone computer programs, image-viewing computer programs, video-playing computer programs, and/or audio-playing computer programs, among other types of computer programs. The graphically represented code objects 208 themselves may include database objects to access or store data of databases, video-playing computer programs, audio-playing computer programs, image-viewing computer programs, geo-spatial information map-viewing computer programs, filter-algorithm programs, and/or model and analysis tool computer programs, among other types of computer programs.

An example application program 210 is depicted that is made up of a chain of graphically represented code objects 212A, 212B, and 212C, collectively referred to as the code objects 212, interconnected with one another via graphically represented inter-code object connections 214A and 214B, collectively referred to as the inter-code object connections 214. The application program 210 is creatable and executable within the graphical white board area 202. The code objects 212 may be instances of the code objects 208, where an instance of one of the code objects 208 is a single copy of that code object. The application program 210 may be constructed asynchronously, where multiple users construct different parts of the program 210 at different times, as well as synchronously, where multiple users construct the program 210 together at the same time. The application program 210 may be stored for later retrieval and use, and furthermore may be modular in nature so that multiple application programs, including the program 210, may be linked together to create even more complex application programs.

The application program 210 may have its usage logged for later auditing, such that it is said that the program 210 is auditable and loggable during usage. The users who construct the application program 210 may be traceable, in that their identities may be able to be known well after the program 210 has been constructed. Similarly, the users who generate or use the application program 210 may also be traceable. The application program 210 may have configurations that are manageable by users who have appropriate security privileges, too. The application program 210 may be able to accept data from dynamically changing input sources and/or from static input sources, as well as from resources accessible over a network.

The results of execution of the program 210 may be able to be reported over such a network. Security privilege-filtered results of execution of the application program 210 may further be able to be reported over such a network. Security privilege-filtered results are results that are filtered so that only the data that a given user have the appropriate security privileges to view and access are provided to that user. A user with the highest security privileges may not have any of the results filtered out when viewing the results. By comparison, a user with the lowest security privileges may only be able to view a small portion of the results, such that the other portions of the results are filtered out and not viewable by this user.

The inter-code object connections 214 are creatable, definable, and movable within the white board area 202. Security privileges may restrict which data are transferred across the inter-code object connections. Security privileges may restrict some users' awareness that inter-code objects exist. Each of the connections 214 represents data transfer between a pair of code objects. For instance, the connection 214A represents data transfer between the objects 212A and 212B, and the connection 214B represents data transfer between the objects 212B and 212C. An inter-code object connection can represent data being sent from a sender object and being received by a receiver object of the pair of code objects connected by the inter-code object connection. Furthermore, more than one inter-code object connection may be specified between a pair of code objects, such that each object may function as both a sender object and a receiver object relative to the other object.

The inter-code object connections 214 further may graphically terminate on edges and/or interiors of the code objects 212. The data represented by an inter-code object connection may be user defined, and may also be filtered and/or modified according to the privileges according to the users. For instance, a user may define the type of data that are transmitted and received via an inter-code object connection. However, that same user may not have the appropriate security privileges to actually access or view the data, whereas another user may have greater security privileges that enable him or her to access and view the data. Additionally, the inter-code object connections 214 may be graphically invisible and/or purposefully limited in their functionality for security reasons, in accordance with the security privileges accorded to the users. The connections 214 may be represented as lines and/or directed graphs.

Furthermore, application programs, like the application program 210, may be connected to one another and to the code objects 212 via additional inter-code object connections, similar to the connections 214, to allow for more complex application programs to be created. In such instance, the application programs are contained within what are referred to as container panels, comparable in functionality to the code objects 212, except that the panels contain application programs, instead of individual code objects. In such instance, the application programs may be referred to as macro programs. Thus, code objects are interconnected to form application programs, and application programs may be interconnected with themselves and other code objects to form more complex application programs.

Figure 3:
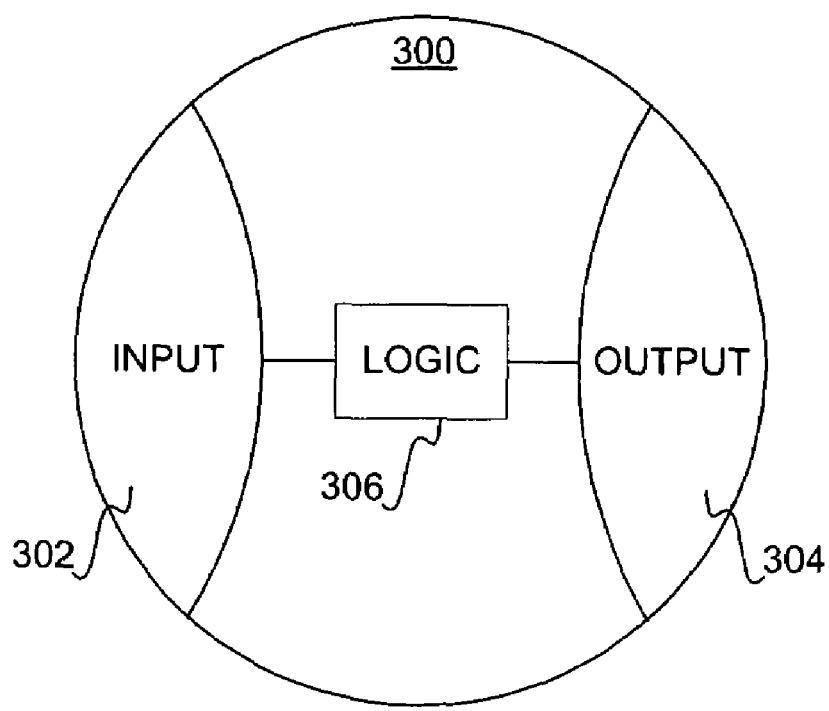
FIG. 3 is a diagram of an example graphically represented code object, according to an embodiment of the invention.

FIG. 3 shows an example graphically represented code object 300, according to an embodiment of the invention. The code object 300 includes input 302, output 304, and internal logic 306. The code object 300 may only include the input 302 or the output 304, and not necessarily both the input 302 and the output 304. The input 302 and the output 304 are referred to as data interfaces. The input 302 specifies the data that are input by the code object 300. The internal logic 306 performs the operations or processing necessary to achieve data that are output at the output 304 in accordance with a given purpose or functionality of the object 300. Such processing by the internal logic 306 is based on the input 302 where the input 302 is present.

The code object 300 may be interconnected with other graphically represented code objects via the input 302 and the output 304 of the object 300. A graphically represented inter-code object connection may connect the output of a second object to the input 302 of the object 300. Furthermore, another inter-code object connection may connect the input of a third object to the output 304 of the object 300. This means that the second object generates data that are transferred therefrom to the input 302 of the code object 300. The internal logic 306 of the code object 300 processes the data that are input, and outputs data on the output 304. The data put out on the output 304 are then input into the third object, which may perform further processing of the data. In this way, application programs made up or composed of chains of code objects may be created by interconnecting the code objects via inter-code object connections.

The internal logic 306, or source code, of the code object 300 may in particular be hidden from users other than the user who authored the code object 300. For example, one group of users, who have computer programming knowledge and experience, may be responsible for developing different types of code objects. Another group of users, who have little or no computer programming, may then employ instances of the code objects, chaining them together to create application programs in a graphical manner. That is, application programs may easily be assembled from existing code objects by users who are not necessarily computer programmers and who do not necessarily have computer programming experience or knowledge.

Construction of Example Application Program

FIGS. 4A-4D illustratively depict the construction of an example application program, according to an embodiment of the invention. The example application program whose construction is depicted in FIGS. 4A-4D is presented for example purposes only. The application program has a rudimentary purpose, to input two numbers, add them together, and display the resulting sum. As can be appreciated by those of ordinary skill within the art, application programs that are more complex than this application program, with more sophisticated functionalities, may also be created within the multiple-user graphical programming and analysis environment of embodiments of the invention.

Figure 4A:
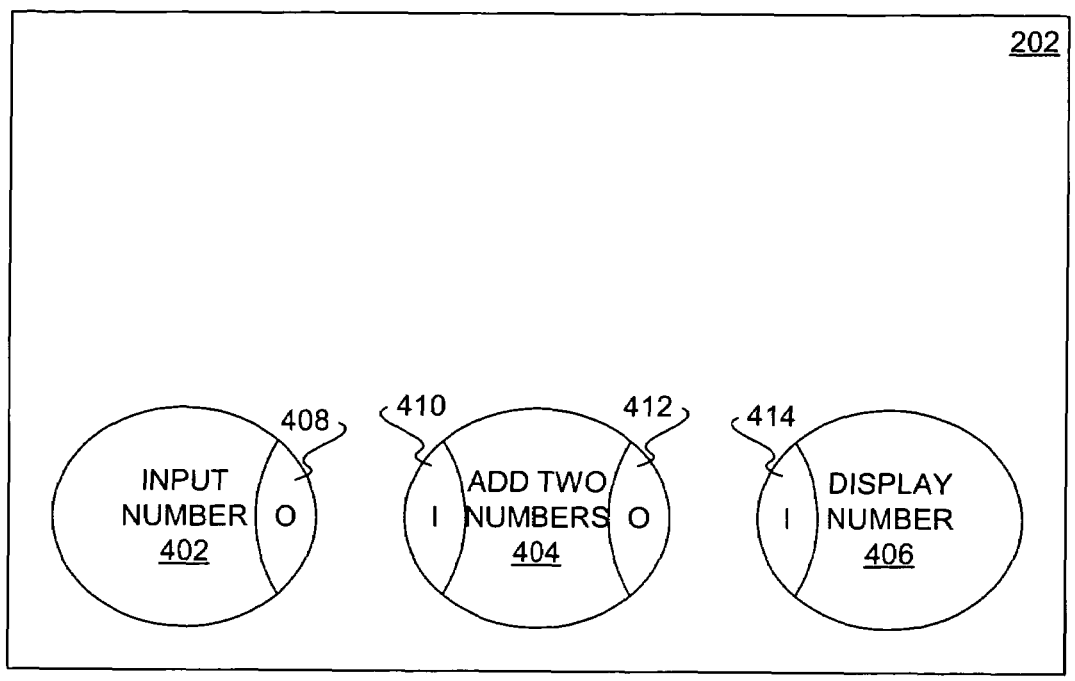
FIGS. 4A, 4B, 4C, and 4D are diagrams depicting an example process of the development of an example application program within a multiple-user graphical programming and analysis environment, according to an embodiment of the invention.

In FIG. 4A, the graphical white board area 202 is shown as including four types of objects: an input number object 402, an add two numbers object 404, and a display number object 406. The input number object 402 has an output 408 that represents the number that was received by the object 402. The add two numbers object 404 has an input 410 that represents the two numbers to be added by the object 404, as well as an output 412 that represents the sum of these two numbers. The display number object 406 has an input 414 that represents the number that is input and displayed by the object 406. The internal logic of the objects 402, 404, and 406 is not shown in FIG. 4A.

One or more users, who have computer programming experience, may have developed the objects 402, 404, and 406, such that they are used to create the example application program by another user or users, who do not necessarily have computer programming experience. The objects 402, 404, and 406 are reusable objects, in that instances thereof may be created and used in a variety of different application programs, and not just the example application program that is being created. That is, the objects 402, 404, and 406 are general-purpose objects, each having its own functionality. Tying or connecting the objects 402, 404, and 406 together, as well as with other objects, allows for the graphical construction of different types of computer programs.

Figure 4B:
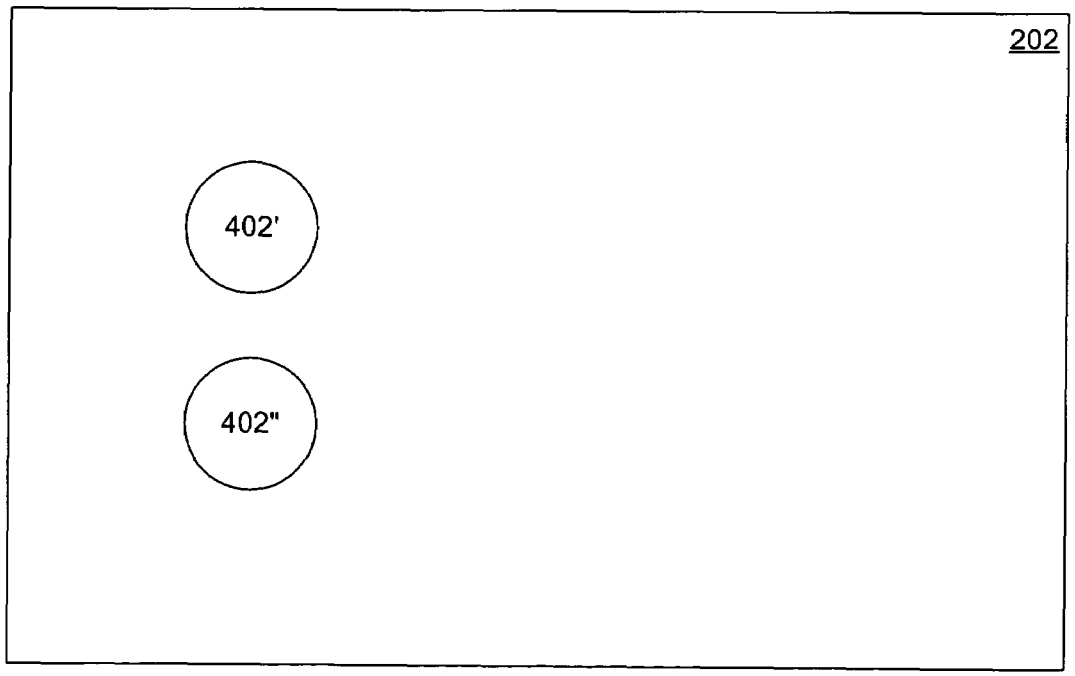
Figure 4C:
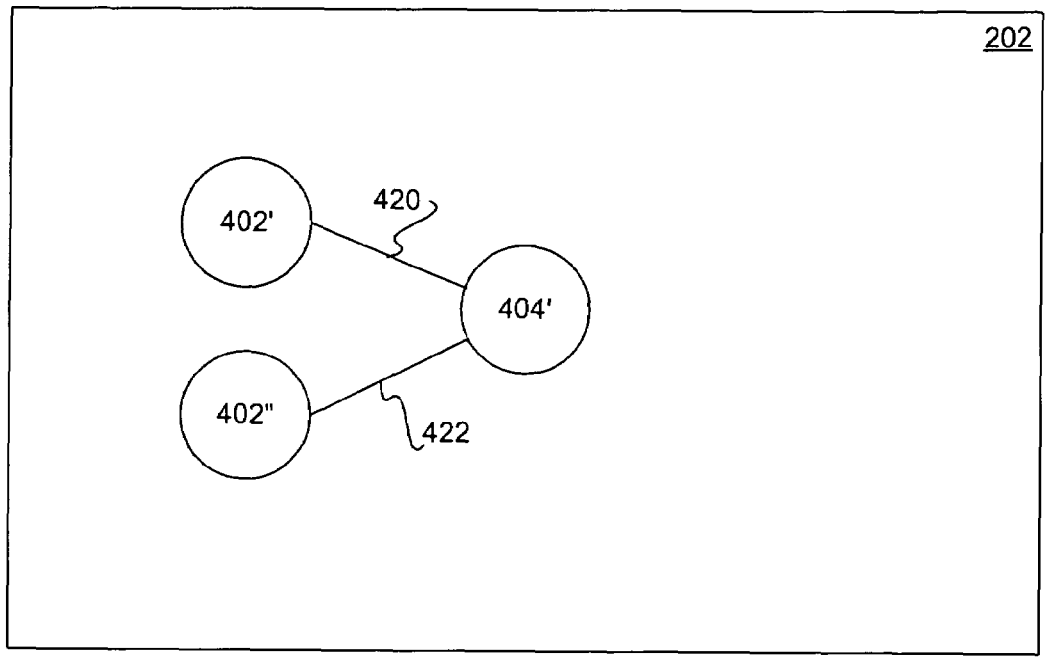
Figure 4D:
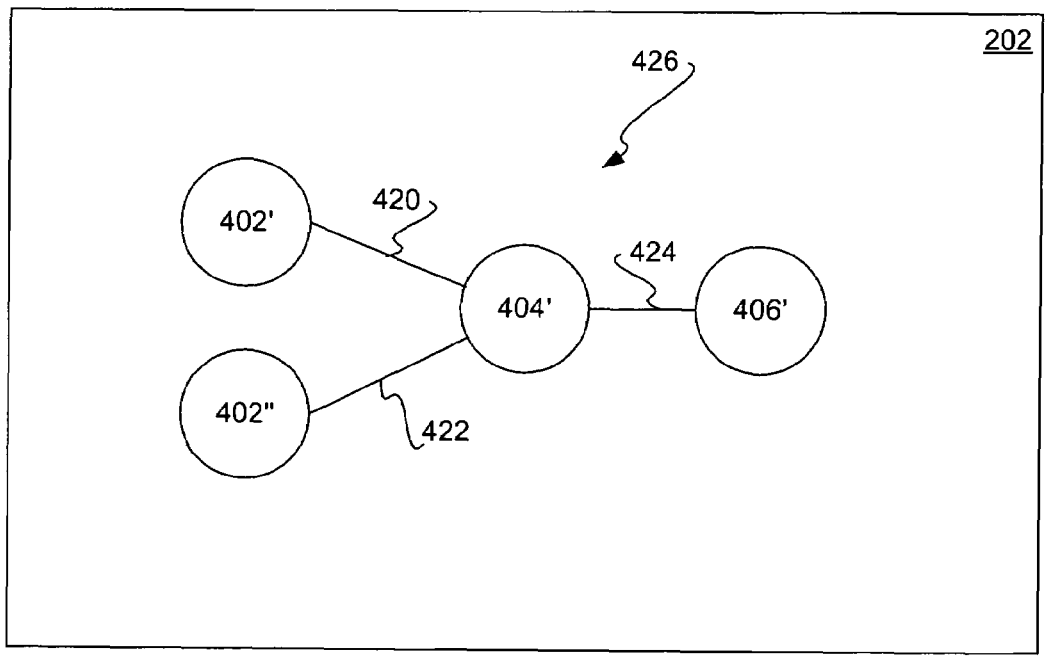

FIGS. 4B-4D depict the actual construction of the example application program from the objects 402, 404, and 406. In FIG. 4B, two instances of the input number object 402 have been instantiated within the graphical white board area 202, which are referenced as the object 402' and the object 402". In FIG. 4C, an instance of the add two numbers object 404 has been instantiated within the white board area 202, which is referenced as the object 404'. Furthermore, two inter-code object connections 420 and 422 have been added, the connection 420 between the object 402' and the object 404', and the connection 422 between the object 402" and the object 404'. The connection 420 connects the output of the object 402' with the input of the object 404', whereas the connection 422 connects the output of the object 402" with the input of the object 404'.

In FIG. 4D, an instance of the display number object 406 has been instantiated within the graphical white board area 202, which is referenced as the object 406'. An inter-code object connection 424 has been added between the object 404' and the object 406'. The connection 424 connects the output of the object 404' to the input of the object 406'. The resulting chain of objects 402', 402", 404', and 406', having the inter-code object connections 420, 422, and 424, makes up the example application program 426. When the example application program 426 is run or executed, objects 402' and 402" query the user for input numbers, which are output by the objects 402' and 402" to the object 404', as indicated by the connections 420 and 422. The object 404' adds these two number, and outputs their sum to the object 406', as indicated by the connection 424. The object 406' then displays this sum.

Figure 5A:
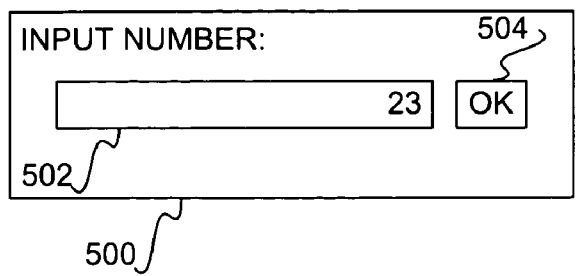
FIGS. 5A, 5B, and 5C are diagrams depicting the example execution, or performance, of an example application program, the development of which is depicted in FIGS. 4A-4D, according to an embodiment of the invention.
Figure 5B:
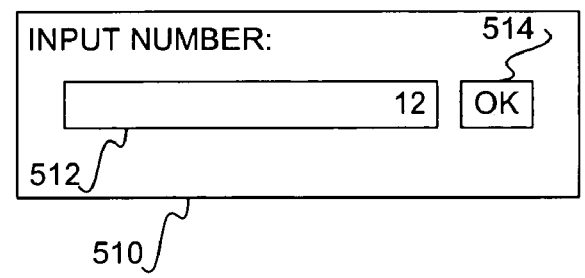
Figure 5C:
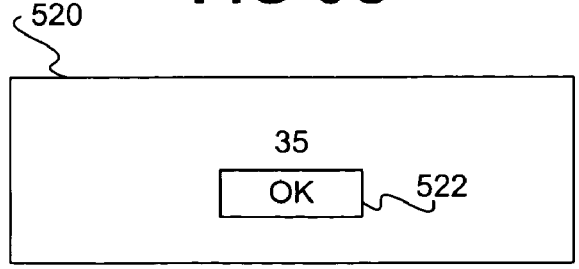

FIGS. 5A-5C illustratively depict the example performance of the example application program 426, according to an embodiment of the invention. In FIG. 5A, a window 500 is displayed to the user, in which the user is requested to input a number within the box 502, and then press the OK button 504. The window 500 may result from performance of the internal logic of the object 402'. In the example performance of the program 426, the number 23 has been entered in the box 502. This is the number that is output by the object 402' and input into the object 404'.

Similarly, in FIG. 5B, a window 510 is displayed to the user, in which the user is requested to input a number within the box 512, and then press the OK button 514. The window 510 may result from performance of the internal logic of the object 402". In the example performance of the application program 426, the number 12 has been entered in the box 502. This is the number that is output by the object 402" and input into the object 404'.

It is noted that even though the objects 402' and 402" are identical copies of the object 402, because they are separate copies, or instances, of the object 402, they run independently of each other. Thus, the object 402' is run to display the window 500 for the user to enter a first number, whereas the object 402" is run to display the window 510 for the user to enter a second number, where both numbers are then input into the object 404'. In this way, the object 402 is reusable even within the application program 426, in that it has been used twice so that two separate and independent numbers can be entered by the user.

The object 404' adds these two numbers together, resulting in their sum of 35. The number 35 is then output by the object 404' and input into the object 406'. Therefore, in FIG. 5C, a window 520 is displayed to the user that shows the number 35, which is the sum of the numbers that the user entered in the windows 500 and 510 of FIGS. 5A and 5B, respectively. The window 520 also includes an OK button 522 that the user presses when he or she is finished viewing the sum of the numbers previously entered. The window 520 is displayed by the object 406'.

Therefore, whereas the object 404' performs the internal calculations necessary to add the two numbers received by the objects 402' and 402", the object 404' does not display the resulting sum itself. Rather, the object 404' passes the resulting sum to the object 406', which actually displays the number input from the object 404'. This means that the sum calculated by the object 404' may be output to other objects, besides just the object 406'. Furthermore, dividing the summing and display functionality between the two objects 404' and 406' renders these two objects as more general-purpose than if a single object had been created that subsumed both addition and display responsibilities. For example, instances of the object 406, such as the object 406', can be used to display any number, and not just a number that is the sum of two other numbers.

Methods

FIG. 6 shows a method 600 for constructing an application program within a multiple-user graphical programming and analysis environment, according to an embodiment of the invention. For example, the method 600 may be employed to construct the application program 426 as depicted in FIGS. 4A-4D, the performance of which is depicted in FIGS. 5A-5C. The method 600 may more generally be used to create other types of application programs within the multiple-user graphical programming and analysis environment as well.

A user initially accesses the graphical programming and analysis environment program (602). For instance, the user may have one of the clients 104 of FIG. 1, running one of the web browsing programs 110 to access the environment 108 running on the servers 102, over the network 106. This user may generate, or another user may have already generated, graphically represented code objects within the environment (604). Generation of code objects includes, for each object, determining the data interface of an object (606), and determining the internal logic of the object (608). The data interface of an object includes inputs and/or outputs, whereas the internal logic of the object generates the outputs, where present, or performs other functionality, relative to the inputs, where present. In one embodiment, the creation or generation of code objects is accomplished outside of the graphical programming and analysis environment program, and then introduced into the environment program so that application programs may be created therefrom, by linking or interconnection of the code objects.

The user, either the user who created the objects or another user, then graphically chains instances of the code objects together via inter-code connections within the environment program (610). A number of users may also collaborate together in chaining instances of objects together. For instance, one user may chain together the code objects created by him or her with the code objects created by other users, to which the user has access based on security privileges accorded to him or her, and/or security privileges of the objects themselves. Chaining code objects together results in inter-code object communication among the objects. For each pair of code objects to be chained together, where each object may be part of a number of such pairs on each of its inputs and outputs, the user may specify a sender object of the pair that sends data to the receiver object of the pair that receives the data.

An application program is thus assembled as one or more chains of interconnected code objects (612). As has been noted, the application program may be created by one or more users, and the users who construct the application program may not be the same users who originally developed the objects, instances of which make up the application program. Finally, the application program is desirably executed, such as within the multiple-user graphical programming and analysis environment (614).

Figure 7:
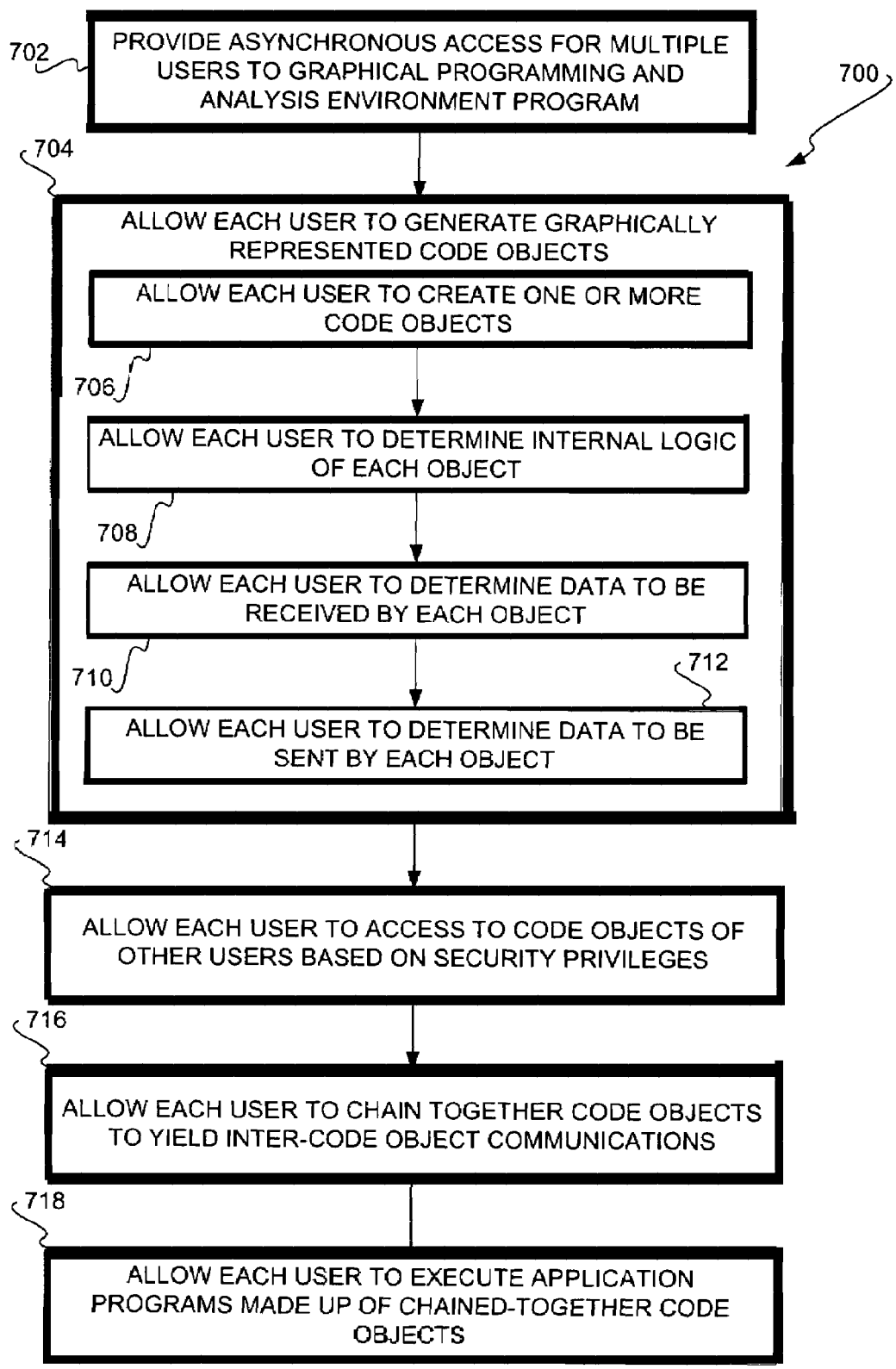
FIG. 7 is flowchart of a method for providing a multiple-user graphical programming and analysis environment, according to an embodiment of the invention.

FIG. 7 shows a method 700 for providing the multiple-user graphical programming and analysis environment that has been described, according to an embodiment of the invention. Asynchronous access for multiple users is provided to a multiple-user graphical programming and analysis environment program (702). For example, access may be provided to multiple users consistent with the system 100 of FIG. 1, in which each user has one of the clients 104. For instance, multiple users may be enabled to log into the environment program remotely, such as over the Internet, such that the users are able to access the program simultaneously.

Furthermore, providing such access to the multiple users can include providing access to application programs executable within the programming and analysis environment, which may be a white board area, as has been described. Such application programs may be executed, such that the results thereof are immediately available to the users. The users may also be provided access to resources that are available on a network to which the programming and analysis environment is communicatively coupled.

Each user may be allowed to generate graphically represented code objects (704). This can include allowing each user to create one or more code objects (706), by allowing a user to determine the internal logic of an object (708), allowing a user to determine the data to be received by an object (710) where appropriate, and allowing a user to determine the data to be output by an object (712) where appropriate. The users have access to the code objects of other users based on their security privileges and the security privileges of the objects themselves (714). Where a user is denied complete access to an object, the user may not be able to even see the object. That is, the only objects rendered visible to a given user may be those to which that the user has some level of access, according to the user's security privileges and/or the security privileges of the object itself.

Each user is further allowed to graphically chain together code objects to which the user has access, to yield inter-code object communications (716). As has been described, for each pair of chained-together code objects, the first object is able to send data that is received by the second object. Another pair of chained-together objects may include exactly the same two objects, but where the second object is able to send data that is received by the first object. Finally, each user may be allowed to execute application programs made up of the chained-together code objects (718). When application programs are executed, the programs may display to the user the end results of the data processed by the code objects upon execution of the application programs, or perform some other functionality.

CONCLUSION

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

We claim:
1. A computer-implemented method comprising:
providing asynchronous access to multiple users to a graphical programming and analysis environment program visually represented as a white board;
wherein each user of the multiple users generates graphically represented code objects within the environment program, to further comprise:
said each user instantiates one or more code objects,
said each user determines an internal logic for each code object of said one or more code objects,
said each user determines first data to be received by said each code object, and
said each user determines second data to be sent by said each code object;
wherein said each user obtains access to the code objects of other users of the multiple users based on security privileges accorded to said each user, in which the code objects reported over a network are hierarchically filtered based on the security privileges according to said each user, and the security privileges restrict those functions or features of the code objects available to said each user;
wherein said each user chains the code objects of said each user to the code objects of the other users to which said each user has access to yield inter-code object communication by inter-code object connections, each inter-code object connection terminating on one of an edge and an interior of one of the code objects and,
wherein said each user executes an application program composed of the code objects as chained together within the environment program, the program operating by:
opening a first input window that displays a first dialog box and a first acknowledgement cursor region, wherein the first dialog box receives the first data and the internal logic receives the first data in response to said each user executing the first acknowledgement cursor region,
opening a second input window that displays a second dialog box and a second acknowledgement cursor region, wherein the second dialog box receives the second data, and the internal logic receives the second data in response to said each user executing the second acknowledgement cursor region, and
opening an output window that displays result data from the internal logic operating on the first and second data, wherein the result data reported over the network are hierarchically filtered based on the security privileges;

opening a chat area within which said each user can communicate with other users; and opening a user list area that displays a name of the multiple users that are currently logged into the environment program.

2. The method of claim 1, wherein providing asynchronous access to the multiple users to the graphical programming and analysis environment program comprises enabling multiple users to log into the environment program remotely, such that the multiple users are able to access the environment program simultaneously.

3. The method of claim 1, wherein allowing said each user access to the code objects of the other users based on security privileges accorded to the user comprises rendering visible to said each user the code objects of the other users to which the user has access.

4. The method of claim 1, wherein allowing said each user to chain together the code objects of the user to the code objects of the other users to which the user has access comprises allowing the user to graphically chain code objects together, such that a sender object of a pair of graphically chained together code objects is able to send data that are received by a receiver object of the pair.

5. The method of claim 1, wherein allowing said each user to execute the application program composed of the code objects as chained together within the environment program comprises displaying to the user end results of data processed by the code objects upon execution of the application programs.

6. The method of claim 1, wherein the graphical programming and analysis environment program comprises an applet program, and said each code object comprises an applet program within a same applet context as the environment program.

7. The method of claim 6, wherein at least one of the graphical programming and analysis environment program and the code objects is developed within an architecture-independent and Internet web browsing program-independent computer programming technology.

8. The method of claim 1, wherein the graphically represented code objects coexist with non-graphically represented code objects within the environment program.

9. The method of claim 8, wherein the non-graphically represented code objects comprise stand-alone computer programs.

10. The method of claim 8, wherein the non-graphically represented code objects comprise one or more of: image-viewing programs, video-playing programs, and audio-playing programs.

11. The method of claim 1, wherein the graphically represented code objects comprise one or more of: database objects, video-playing programs, audio-playing programs, image-viewing programs, geo-spatial information map-viewing programs, filter-algorithm programs, and model and analysis tool programs.

12. The method of claim 1, wherein providing asynchronous access to the graphical programming and analysis environment program comprises providing application program executable within the white board.

13. The method of claim 12, wherein providing the application programs executable within the white board comprises executing the application program such that results thereof are immediately available to the multiple users.

14. The method of claim 1, wherein providing asynchronous access to the graphical programming and analysis environment program comprises allowing users to access resources available on a network to which the graphical programming and analysis environment program is communicatively coupled.

15. An apparatus to provide an environment for multiple-user graphical programming and analysis by machine-readable instructions executable on a computer platform said: apparatus comprising:

at least one or more processors configured to:

create a plurality of graphically represented code objects, each code object created by a user and accessible by other users in accordance with security privileges of the other users, said each code object comprises:

a data interface indicating first data to be input into the code object and second data to be output by the code object, and internal logic to generate the second data from the first data;

create a plurality of graphically represented inter-code object connections, each inter-code object connection representing data transfer between a pair of code objects;

create at least one application program composed of one or more chains of the code objects interconnected via the inter-code object connections, the program including opening operations for:

a first input window for playing a first dialog box and a first acknowledgment cursor region, wherein the first dialog box receives the first data and the internal logic receives the first data in response to said each user executing the first acknowledgement cursor region, a second input window for displaying a second dialog box and a second acknowledgement cursor region, wherein the second dialog box receives the second data, and the internal logic receives the second data in response to said each user executing the second acknowledgement cursor region, and an output window for displaying result data from the internal logic operating on the first and second data, wherein the result data reported over the network are hierarchically filtered based on the security privileges; and, create a graphical white board area within which to dispose the code objects and to create the inter-code object connections, create a chat area within which the said user can communicate with other users; and create a user list area showing a name of each of the user and other users currently logged into the environment program, wherein the application program is executable within the graphical white board area, and each inter-code object connection terminates on one of an edge and an interior of one of the code object, and wherein said each user obtains access to the code objects of other users based on security privileges accorded to the user, in which the code objects reported over a network area hierarchically filtered based on the security privileges according to the user, and the security privileges restrict those functions or features of the code objects available to the user.

16. The apparatus of claim 15, wherein each code object is an applet program.

17. The apparatus of claim 16, wherein the graphical white board area is an applet program having a context within which each code object runs.

18. The apparatus of claim 16, wherein the applet program is a JAVA® applet program.

19. The apparatus of claim 15, wherein each code object has at least one inter-code object communication graphically terminating on one of an edge and an interior of the code object.

20. The apparatus of claim 15, wherein each inter-code object connection represents data being sent by a sender object of the pair of code objects and being received by a receiver object of the pair of code objects.

21. The apparatus of claim 20, wherein the data axe at least one of: user defined, and filtered according to security privileges accorded to the users.

22. The apparatus of claim 15, wherein at least one of the inter-code object connections is one of graphically invisible and purposefully limited in functionality for security.

23. The apparatus of claim 15, wherein each inter-code object connection is graphically represented by one of a line and a directed graph.

24. The apparatus of claim 15, wherein the at least one application program is constructed one of asynchronously and synchronously.

25. The apparatus of claim 15, wherein the at least one application program is at least one of: capable of being stored for later retrieval and use, and modular in nature so that more complex application programs may be constructed therefrom.

26. The apparatus of claim 15, wherein the at least one application program is contained within container panels as macro programs, the container panels interconnectable via additional inter-code object connections.

27. The apparatus of claim 15, wherein the at least one application program is at least one of: auditable and loggable during usage, traceable to users who construct the programs, traceable to users who use the programs, and configuration manageable.

28. The apparatus of claim 15, wherein the at least one application program is at least one of:
    capable of accepting data from dynamically changing input sources, from static input sources, and from network-accessible resources;
    capable of network reporting results thereof; and,
    capable of networking reporting security privilege-filtered results thereof.

29. A computer-implemented method comprising:
    accessing by a user a graphical programming and analysis environment program that other users are already currently accessing;
    generating by the user graphically represented code objects within the environment program, wherein for each code object,
        the user determining a data interface indicating first data to be input into the code object and second data to be output by the code object; and
        the user determining internal logic to generate the second data from the first data;
    graphically chaining together the code objects by the user within the environment program, including chaining together the code objects generated by the user and code objects generated by the other users to which the user has access based on security privileges accorded to the user, to yield inter-code object communication by inter-code object connections, each inter-code object connection terminating on one of an edge and an interior of one of the code objects;
    hierarchically filtering the code objects reported over a network based on the security privileges according to the user; and
    assembling an application program by the user within the environment program, each application prepare composed of the code objects as have been chained together the application program operating by:
        opening a first input window that displays a first dialog box and a first acknowledgement cursor region, wherein the first dialog box receives the first data, and the internal logic receives the first data in response to said each user executing the first acknowledgement cursor region,
        opening a second input window that displays a second dialog box and a second acknowledgement cursor region, wherein the second dialog box receives the second data and the internal logic receives the second data in response to said each user executing the second acknowledgement cursor region, and
        opening an output window that displays result data from the internal logic operating on the first and second data, wherein the result data reported over the network are hierarchically filtered based on the security privileges;
    opening a chat area within which said each user can communicate with other users;
    opening a user list area that displays a name of multiple users that are currently logged into the environment program, and
    providing access for each said user to the code objects of the other users of the multiple users based on security privileges accorded to the user, wherein the security privileges restrict those functions or features of the code objects available to the user.

30. The method of claim 29, further comprising executing by the user of the application programs within the environment program.

31. The method of claim 29, wherein chaining together code objects by the user comprises the user, for each pair of code objects to be chained together, specify a sender object of the pair to send data and a receiver object of the pair to receive the data.

32. The method of claim 29, wherein the graphical programming and analysis environment program comprises an applet program, and each code object comprises an applet program within a same applet context as the environment program.

33. The method of claim 1, wherein opening an output window further includes displaying a third acknowledgement cursor region thereby allowing said each user to terminate the output window in response to said each user executing the third acknowledgement cursor region.

34. The apparatus of claim 15, wherein the output window further includes a third acknowledgement cursor region that allows said each user to terminate the output window in response to said each user executing the third acknowledgement cursor region.

35. The method of claim 29, wherein opening an output window further includes displaying a third acknowledgment cursor region thereby allowing said each user to terminate the output window in response to said each user executing the third acknowledgement cursor region.

36. The apparatus of claim 15, wherein an omnbibus processor combines operations of said at least one processor.

* * * * *